United States Patent [19]

Herbulot et al.

[11] Patent Number: 4,655,332
[45] Date of Patent: Apr. 7, 1987

[54] ASSISTED CLUTCH

[75] Inventors: Jean Herbulot, Franconville; Gérard Escaillas, Paris, both of France

[73] Assignee: Valeo, Paris, France

[21] Appl. No.: 704,087

[22] Filed: Feb. 22, 1985

[30] Foreign Application Priority Data

Feb. 24, 1984 [FR] France .................... 84 02880

[51] Int. Cl.⁴ .................................. F16D 23/12
[52] U.S. Cl. ........................ 192/70.28; 192/99 S; 192/101
[58] Field of Search ............ 192/70.27, 70.28, 89 R, 192/99 R, 99 S, 101; 74/97, 516

[56] References Cited

U.S. PATENT DOCUMENTS

| 3,908,514 | 9/1975 | Rist | 91/391 |
| 4,393,907 | 7/1983 | Kronstadt | 192/89 R X |

FOREIGN PATENT DOCUMENTS

| 1131520 | 6/1962 | Fed. Rep. of Germany . | |
| 1902895 | 8/1970 | Fed. Rep. of Germany . | |
| 2019412 | 12/1971 | Fed. Rep. of Germany . | |
| 1402333 | 5/1965 | France . | |
| 2099845 | 3/1972 | France . | |
| 2134728 | 12/1972 | France . | |
| 2196045 | 3/1974 | France . | |
| 2311677 | 12/1976 | France . | |
| 2452030 | 10/1980 | France . | |
| 45-30493 | 10/1970 | Japan | 192/99 S |
| 1423605 | 2/1976 | United Kingdom | 192/89 R |

*Primary Examiner*—Rodney H. Bonck
*Assistant Examiner*—Richard M. Lorence
*Attorney, Agent, or Firm*—Charles E. Brown; Charles A. Brown

[57] ABSTRACT

A clutch comprises at least one friction disk and clutch plates adapted to clamp the friction disk(s). Elastic means act on at least one of the clutch plates and urge the clutch plates together to clamp the friction disk(s) and thereby engage the clutch. Clutch release control means comprising a pedal are adapted to unclamp the friction disk(s) and thereby release the clutch. Assistance means for the pedal cooperate with a combination comprising at least first and second mobile members each of which is adapted to move along a respective path at the same time as the other of the first and second mobile members, proportionately to movement of the movement transmission means interconnecting the first and second mobile members. The assistance means cooperate with the combination of mobile members, are disposed between the first and second mobile members and are operative on the control means according to a predetermined law as function of the simultaneous but non-identical movements of the first and second mobile members.

11 Claims, 8 Drawing Figures

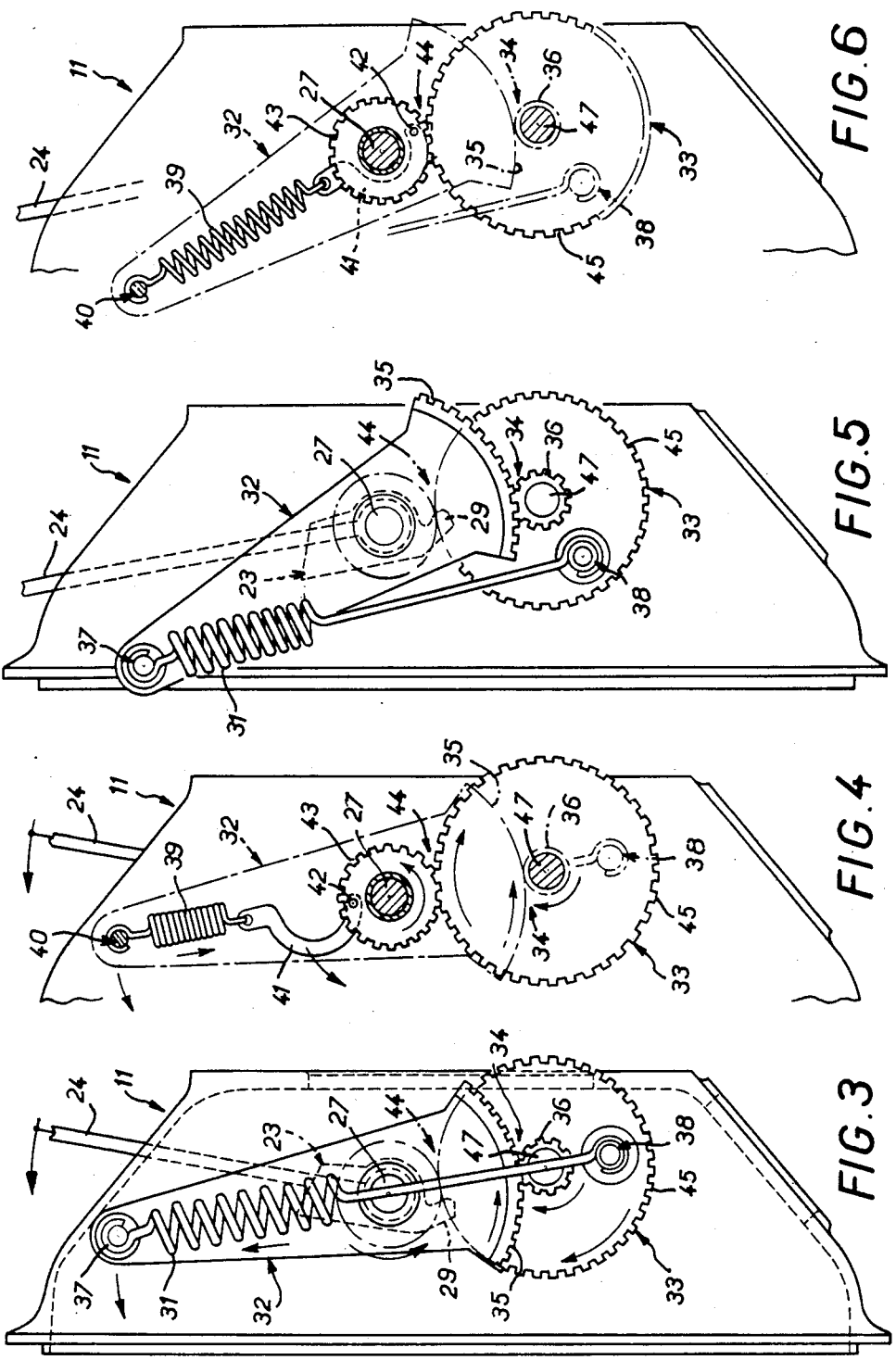

ASSISTED CLUTCH

BACKGROUND OF THE INVENTION

1. Field of the Invention

The present invention concerns a clutch, in particular for automobile vehicles, comprising at least one friction disk and clutch plates for clamping this friction disk, at least one of these clutch plates being operated on by, on the one hand, elastic clutch engagement means which urge the clutch plates together to clamp the friction disk and thereby engage the clutch and, on the other hand, clutch release control means comprising a pedal and adapted to move the clutch plates apart to unclamp the friction disk and thereby release the clutch, and assistance means for reinforcing the action of the pedal.

2. Description of the Prior Art

These assistance means are not intended to eliminate all the effort which the driver has to exert on the pedal, but merely to reduce this effort. In this way the driver remains highly sensitive to vehicle driving conditions without excessive fatigue. Assistance of this kind is of particular but not exclusive benefit in the case of heavy goods vehicles. In such vehicles, when there is no assistance, it is often necessary to provide two friction disks to obtain a reasonable pedal operating force, which complicates construction.

Since this kind of assistance entails a residual force to be exerted on the pedal by the driver, the intervention of the assistance means must be perfectly harmonised with the action of the driver on the pedal, given that the resistance of the elastic clutch engagement means varies with travel. It is often considered desirable to vary the assistance force proportionately to variations in the resistance due to the elastic clutch engagement means. The curve of these variations may have a more or less simple shape according to the nature of the elastic clutch engagement means. This shape is relatively simple when these elastic means consist in helical springs. It is slightly more complicated, featuring a saddle, when the elastic clutch engagement means consist in a diaphragm spring.

Assistance means as proposed until now have not provided a totally satisfactory respose to this condition and have not provided for a convenient choice in the manner of variation in the assistance force, not only to take account of variations in the resistance of the elastic clutch engagement means, but also and more generally to obtain operating conditions which are optimised from all points of view.

An object of the present invention is a clutch, in particular for automobile vehicles, of the type indicated hereinabove and which constitutes a better response than available in the past to the various desiderata of good practice and the assistance means of which, for reinforcing the action of the pedal, meet the most severe and the most diverse demands to secure faultless operation.

SUMMARY OF THE INVENTION

The invention consists in a clutch comprising at least one friction disk, clutch plates adapted to clamp said at least one friction disk, elastic means acting on at least one of said clutch plates and adapted to urge said clutch plates together so as to clamp said at least one friction disk and thereby engage the clutch, clutch release control means comprising a pedal and adapted to unclamp said at least one friction disk and thereby release the clutch, assistance means for reinforcing the action of said pedal, a combination comprising at least first and second mobile members each of which is adapted to move along a respective path at the same time as the other of said first and second mobile members and proportionately to movement of said control means, and movement transmission means interconnecting said first and second mobile members, said assistance means cooperating with said combination of mobile members, being disposed between said first and second mobile members and being operative on said control means according to a predetermined law as a function of the simultaneous non-identical movements of said first and second mobile members.

By virtue of this arrangement, and through a judicious choice of the kinematic system which has just been described, a choice which is facilitated by the large number of parameters, the control means can be made to conform to the predetermined law selected to yield the best possible conditions for intervention by the assistance means.

Generally speaking, the control means comprise at least one shaft, a fork fastened to said at least one shaft, a clutch release bearing on which said fork is operative and which is operative on said clutch plates so as to move them apart, a pivot pin for said pedal, a second shaft, and a toothed wheel on said second shaft fastened to said second mobile member, wherein said first mobile member is fastened to said at least one shaft and meshes with said toothed wheel.

In one embodiment, the assistance means comprise a spring having respective ends coupled to said first and second mobile members, the arrangement being such that with the clutch engaged said ends of said spring are substantially aligned with said at least one shaft, whereby said spring is charged when the clutch is engaged.

In accordance with another characteristic of the invention, a second spring with different characteristics to the first-mentioned spring and acting in opposition thereto contributes to aligning the ends of the first-mentioned spring with said at least one shaft when the clutch is engaged.

The clutch preferably further comprises a toothed idler wheel on said at least one shaft meshing with the second mobile member and the second spring preferably has its ends respectively coupled to the first mobile member and the toothed idler wheel.

In one embodiment, the control means comprise at least one shaft, a fork fastened to said at least one shaft, a clutch release bearing on which the fork is operative and which is operative on the clutch plates so as to move them apart, and means linking the pedal to said at least one shaft, the means linking the pedal to said at least one shaft and said first and second mobile members being disposed on respective opposite sides of the clutch axis so as to balance the forces acting on the fork. This decreases wear and increases the service life of the assembly.

Appropriate means may be associated with the two mobile member in order to modify at will the manner in which the force developed by the assistance means varies as a function of movement of the clutch release control means.

Specifically, in one such arrangement, further comprising release bearing means and a fixed frame, the first mobile member couples the combination of mobile members to the control means and the second mobile member is in two parts of which a first meshes with the first mobile member and the second is selectively coupled by the release bearing means to the first part or to the fixed frame, the assistance means being disposed between the first mobile member and the second part of the second mobile member.

Alternatively, the clutch further comprises a fixed frame and at least one auxiliary spring coupled to the fixed frame and at least one of the mobile members. This auxiliary spring is preferably coupled on with clearance.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIG. 3 is a view of the mobile members and assistance means in elevation in the direction of the arrow III in FIG. 2, with the control means in the clutch engaged position.

FIG. 4 shows the return spring of the mobile members in the clutch engaged positions, in elevation in the direction of the arrows IV—IV in FIG. 2, the control means being in the clutch engaged position.

FIG. 5 is a view analogue to FIG. 3 but in which the control means is in the clutch disengaged position.

FIG. 6 is a view analogous to FIG. 4 in which the control means is in the clutch disengaged position.

DESCRIPTION OF THE PREFERRED EMBODIMENTS

Figure 1:
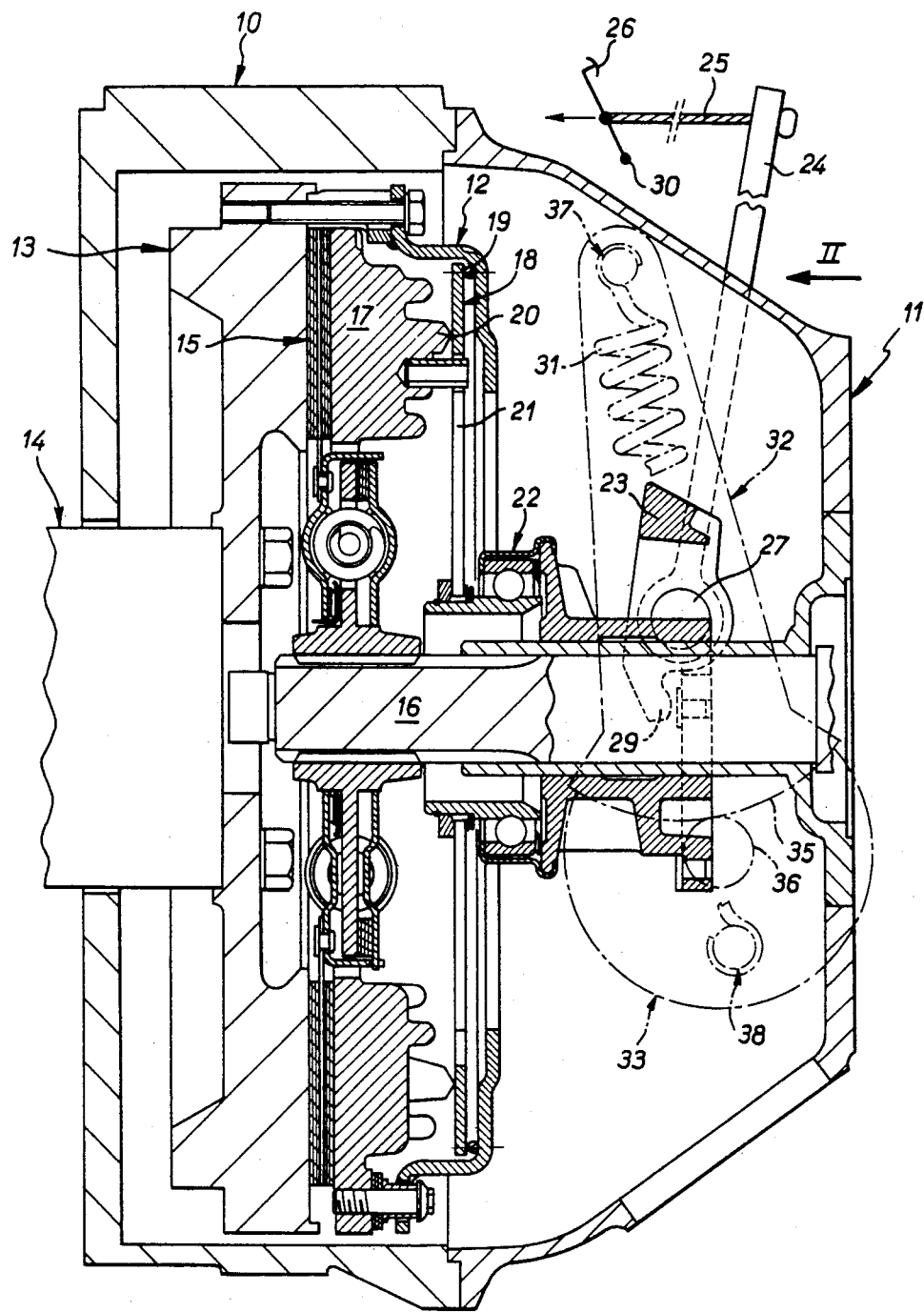
FIG. 1 is a view of a clutch in accordance with the invention in longitudinal cross-section on the line I—I in FIG. 2.

Reference will first be made to FIGS. 1 through 6 which concern by way of non-limiting example one application of the invention to a diaphragm spring clutch, in particular for automobile vehicles, more particularly for heavy goods vehicles.

The clutch is enclosed in a fixed casing comprising two parts 10 and 11 fastened together. The part 10 which is on the engine side is generally drum-shaped whereas the part 11 which is on the gearbox side is generally bell-shaped.

The clutch comprises a cover 12 adapted to be fixed to the flywheel 13 of the engine shaft 14 of the automobile vehicle. This flywheel 13 constitutes a reaction plate. The clutch also comprises at least one friction disk 15 which is coupled to the primary shaft 16 of the gearbox of the automobile vehicle. The disk 15 is adapted to be clamped between the reaction plate 13 and a pressure plate 17 constrained to rotate with the cover and mobile axially relative to the latter when acted on by elastic clutch engagement means 18 which urge the plates 17 and 13 together to clamp the friction disk 15 and thereby engage the clutch.

The elastic clutch engagement means 18 consist in a diaphragm spring. This diaphragm spring bears on the cover 12 at 19 and on the pressure plate 17 at 20. The diaphragm spring 18 has in its central region fingers 21 which are adapted to be pulled towards the right in FIG. 1 by a clutch release bearing 22 when it is required to actuate the clutch from its engaged state as represented in FIG. 1, in which the release bearing 22 exerts no significant effect on the diaphragm spring 18, to a disengaged position in which the release bearing 22 by pulling the fingers 21 towards the right in FIG. 1 cancels the clamping action on the pressure plate 17, which releases the friction disk 15.

The clutch release bearing 22 forms part of clutch release control means which comprise, in addition to this release bearing 22, a pivoting fork 23, a lever 24, a cable 25 and a pedal 26.

The fork 23 is fastened to a rotary shaft 27 rotatably mounted in bearings 28 in the fixed bell 11. The fork 23 features two branches 29 which cooperate with the release bearing 22 to move it towards the right in FIG. 1 when it is desired to actuate the clutch from its engaged state to a disengaged state. The lever 24 is fastened to the fork shaft 27 and is disposed on one side of the fixed bell 11, namely the righthand side in FIG. 2. The cable 25 links the lever 24 to the pedal 26 which pivots on a pin 30 (FIG. 1).

As can be seen, the clutch release control means 22, 23, 27, 24, 25, 30, 26 comprising the pedal 26 are adapted to move the plates 17 and 13 apart to unclamp the friction disk 15 and thereby disengage the clutch.

Assistance means 31 are provided to reinforce the action of the pedal 26.

The assistance means 31 cooperate with a combination of at least two mobile members 32 and 33. This combination 32, 33 is coupled to the clutch release control means 22, 23, 27, 24, 25, 30, 26. The two mobile members 32 and 33 of the combination are interconnected by movement transmission means consisting in the example shown of meshing means 34 (FIG. 3).

More particularly, the combination 32, 33 is coupled to the clutch release control means 22, 23, 27, 24, 25, 30, 26 by the mobile member 32 which drives the other mobile member 33 through the meshing means 34.

More particularly, in the example shown in FIGS. 1 through 6, the mobile member 32 consists in a lever which is fastened to the fork shaft 27. The lever 32 features a toothed sector 35 which meshes with a toothed wheel 36 to which the second mobile member 33 is fastened and which is mounted on a shaft 47 parallel to the shaft 27.

The clutch release control means 22, 23, 27, 24, 25, 30, 26 are overall movable between a clutch engaged position (shown in FIG. 1) and a clutch disengaged position and are moved over a "go" stroke by the action of the pedal 26 overcoming the elastic action of the diaphragm spring 18 and over a "return" stroke, in response to release of the pedal 26, by the action of the diaphragm spring 18, preponderant at that time.

The assistance means 31 comprise an energy storage device which is coupled between two mobile members 32 and 33 of the combination 32, 33 and which is adapted to be charged, at least in part, by the diaphragm spring 18 during the return stroke of the control means 22, 23, 27, 24, 25, 30, 26, to retain its charge in the clutch engaged position of these control means, and to release its charge to assist the pedal 26 when the latter is acted on to cause said control means to make the go stroke.

The energy storage device 31 comprises elastic means which are charged during the return stroke of the control means and discharged, assisting the pedal, during the go stroke of the control means. This elastic energy storage means comprises at least one spring 31, as seen in FIGS. 1 through 6, and has its ends 37 and 38 respectively attached to the two mobile members 32 and 33 of the combination 32, 33.

The spring 31 is adapted to retain its charge in the clutch engaged position of the control means 22, 23, 27, 24, 25, 30, 26 by virtue of the fact that the two ends 37 and 38 are adapted to be aligned with the rotary shaft 27 in this position, as is seen in FIGS. 1 and 3.

A second spring 39, weaker than the assistance spring 31 and acting in the opposite direction, is adapted to assist alignment of the two ends 37 and 38 of the assistance spring 31 with the rotary shaft 27 in the clutch engaged position (FIG. 4).

Figure 2:
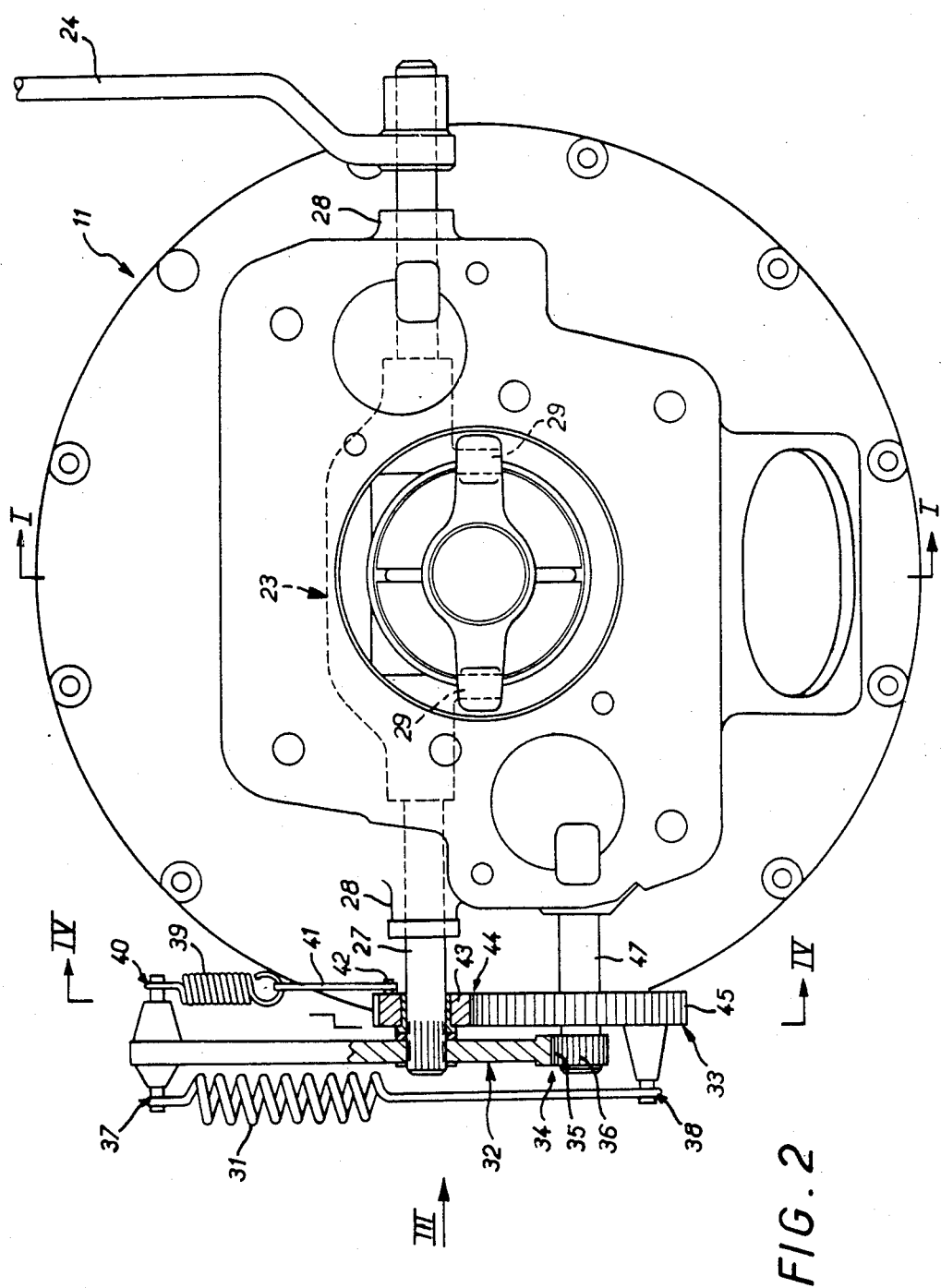
FIG. 2 is a view of this clutch to a smaller scale and in elevation in the direction of the arrow II in FIG. 1.

In the example shown in FIGS. 1 through 6, this alignment return spring 39 is coupled at 40 to the lever 32 and to a sickle-shaped member 41 (FIG. 4) which is itself coupled at 42 to a toothed idler wheel 43 mounted on the shaft 27 and meshing at 44 with the toothed circular profile 45 of the member 33 (see also FIG. 2).

As is seen in FIG. 2, the assistance means 31, the combination 32 and 33 and the alignment return spring 39 are disposed on the lefthand side of the bell 11, that is to say opposite the lever 24 forming part of the clutch release control means 22, 23, 27, 24, 25, 30, 26. An arrangement of this kind in which the control means proper and the assistance means are disposed on opposite sides of the clutch axis provides for balancing the forces on the fork 23 and thus for improving the durability and service life of the various component parts of the clutch and its control means, especially when the shaft 27 comprises two half-shafts, as in FIG. 2.

When the pedal 26 is released, the clutch is held engaged by the action of the diaphragm spring 18 on the plate 17 which clamps the friction disk 15 against the plate 13. In this position, the clutch release bearing 22 is on the left, as seen in FIG. 1. The fork shaft 27 is held in an angular position shown in FIGS. 3 and 4 in which the points 37 and 38 are aligned with the shaft 27. In a position like this, the spring 31 is charged to the maximum and has no effect on the members 32 and 33, by virtue of this alignment.

When the pedal 26 is pressed to release the clutch, the elastic resistance of the diaphragm spring 18 is overcome as is that, much lower, of the spring 39 and the points 37 and 38 begin to move out of alignment with the shaft 27. Because of this, the spring 31 comes into effect, assisting the action on the pedal 26 and reducing the force the drive has to exert. This applies throughout the go stroke of the clutch release control means 22, 23, 27, 24, 25, 30, 26 between the clutch engaged position of FIG. 3 and the clutch disengaged position of FIG. 5.

It is seen in FIG. 5 that the assistance spring 31 has become discharged. During this time, the alignment return spring 39 (FIG. 6) has become extended but this is in opposition to a resistance which is relatively low as compared with the force of the spring 31. It will be noted that the sickle shape of the member 41 is designed to allow this member to pass from the position of FIG. 4 to that of FIG. 6 without it being impeded by the shaft 27 which it is adapted to straddle, as is seen in FIG. 6.

Consequently, the action of the pedal 26 is reinforced by the assistance spring 31 during the go stroke of the clutch release control means 22, 23, 27, 24, 25, 30, 26.

As is seen in FIGS. 3 and 5, each of the mobile members 32 and 33 of the combination 32, 33 is adapted to move over its own path at the same time as the other and proportionately to the movement of the control means 22, 23, 27, 24, 25, 30, 26. The assistance spring 31 disposed between the members 32 and 33 acts on the control means 22, 23, 27, 24, 25, 30, 26 according to a predetermined law as a function of the simultaneous movements of both the mobile members 32 and 33 of the combination 32, 33. Through a judicious choice of the component parts of the combination 32 and 33 and the way in which these members move, it is therefore possible and simple to confer on the mode of action of the assistance spring 31 any form considered best for the assistance requirement. The arrangements shown in FIGS. 3 through 6 provide an excellent example of a choice of this kind. In particular, it may be envisaged to vary the intensity of the action of the spring 31, as applied to the fork shaft 27, as a function of the displacement of the control means 22, 23, 27, 24, 25, 30, 26 which take into account variations in the elastic resistance due to the diaphragm spring 18 during this stroke so as to give the driver the impression that he is acting progressively and gently even if the diaphragm spring produces a resistance which is not always in the same direction, given the saddle shape of the curve which plots the variations in the elastic resistance of a diaphragm spring as function of travel. However, the judicious choice of the arrangement chosen for the combination 32, 33 remains a simple one by virtue of the larger number of parameters offered thanks to the invention, when the elastic means of the clutch are in a form other than that of a diaphragm spring 18, for example consisting in helical springs or having any other appropriate shape. Furthermore, it is easy to confer on the mode of action of the assistance spring 31 any form which takes account not only of the nature of the variations in the resistance of the elastic means 18 but also of all other appropriate factors judged relevant to obtaining assistance which is both effective and agreeable to the driver.

When the driver releases the pedal 26 in order to re-engage the clutch, the diaphragm spring 18 becomes preponderant and returns the clutch to its engaged position as shown in FIG. 1. During this return stroke of the control means 22, 23, 27, 24, 25, 30, 26 the diaphragm spring charges the assistance spring 31 which thus goes from the position of FIG. 5 to that of FIG. 3. When the foot-off position is approached, the return spring 39 places the points 37 and 38 in perfect alignment with the shaft 37 and in any event contributes to the attaining of such alignment, so that in this position the spring 31, which is bent, has no effect on the shaft 27 and waits for the next actuation of the pedal 26 to release the clutch to assist the action of pedal 26, as previously described.

The simple and convenient construction of the arrangement described with reference to and shown in FIGS. 1 to 6 will be appreciated.

In an alternative arrangement (FIG. 7), similar to that which has been described with reference to FIGS. 1 through 6, the combination is again coupled to the clutch release control means 22, 23, 27, 24, 25, 30, 26 via the first member 32 which is fastened to the fork shaft 27. In this instance, however, the second member is in two parts 33A and 33B. The first part 33A meshes at 34 with the first member 32. The second part 33B is selectively coupled by stop means 50, 51 to the first part 33A or a fixed frame 52. The assistance spring 31 is disposed between the mobile member 32 and the second part 33B of the other mobile member 33A-33B.

An arrangement of this kind makes it possible to modify at will the manner in which the assistance spring 31 is adapted to reinforce the action of the pedal 26 throughout displacement of the clutch release control means 22, 23, 27, 24, 25, 30 and 26.

Figure 7:
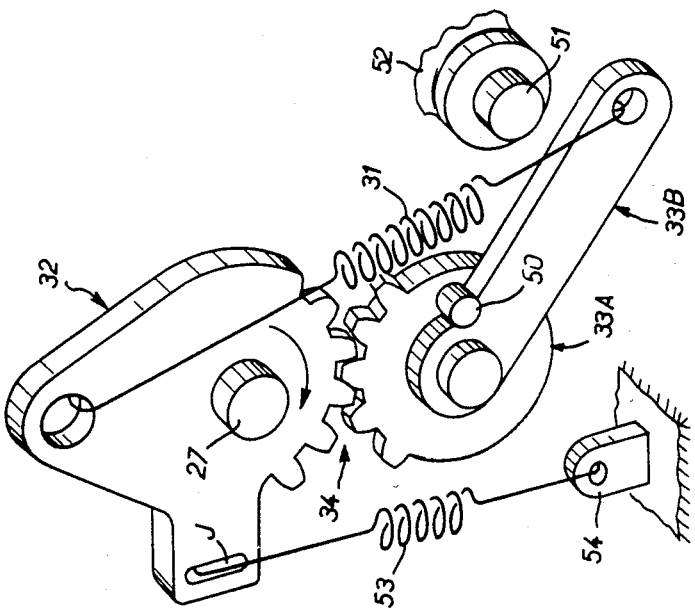
FIGS. 7 and 8 concern two respective alternative embodiments.

In another alternative embodiment (FIG. 8) the arrangement is analogous to that which has been described with reference to FIG. 7, but an auxiliary spring 53 is provided, coupled between one at least of the mobile members, the member 32 as it happens, and a fixed frame 54.

Figure 8:
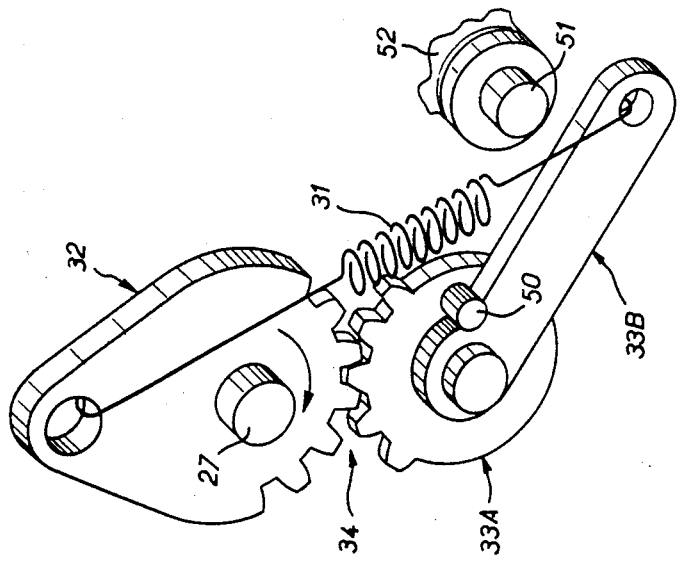

As is seen in FIG. 8, this coupling comprises a clearance J. An arrangement of this kind makes it possible to modulate at will the manner in which the assistance spring 31 reinforces the action of the pedal 26 to release the clutch.

It will be understood that various changes in the details, materials and arrangement of parts which have been herein described and illustrated in order to explain the nature of the invention may be made by those skilled in the art within the principle and scope of the invention as expressed in the appended claims.

In particular, the clutch which has been shown is of the so-called "pull" type, which means that release of the clutch is obtained by pulling on the fingers of the diaphragm spring. It may instead be of the "push" type in which releasing the clutch is achieved by pushing on the fingers of the diaphragm spring. The elastic means may consist in a diaphragm spring or they may be of any other form, helical springs, for example. The clutch may be single-disk, dual-disk or otherwise. The combination 32, 33 may be coupled to the clutch release control means not only by one of the members, such as 32, constituting it but also by a third member other than 32 or 33. The combination 32, 33 may be coupled to the clutch release control means at any appropriate location, not only the fork shaft 27, but also the pivot pin of the pedal 30 or some other location, the release bearing, for example. The meshing means 34 may be of any appropriate form and comprise toothed wheels and/or a rack placed on the release bearing, for example. The movement transmission means may furthermore consist in meshing means or be of any other form. Likewise, the assistance spring could comprise two springs, in series of different stiffness or a spring of variable stiffness to offer even better adaptation to the variation in the resistance due to the elastic clutch engagement means, especially where the latter consist in a diaphragm spring. It will be understood that the construction in accordance with the present invention is adaptable without significant modification to current commercially available equipment, especially when the bell 11 is a standard type, that is to say able to accommodate "pull" and "push" type clutches, as shown in FIG. 2. In this case the shaft 47 is installed by means of openings provided in the bell 11 for a "push" type fork shaft.

We claim:

1. Clutch comprising at least one friction disk, clutch plates adapted to clamp said at least one friction disk, elastic means acting on a least one of said clutch plates and adapted to urge said clutch plates together so as to clamp said at least one friction disk and thereby engage the clutch, clutch release control means comprising a pedal and adapted to unclamp said at least one friction disk and thereby release the clutch, assistance means for reinforcing the action of said pedal, a combination comprising at least first and second mobile members each of which is adapted to move along a respective path at the same time as the other of said first and second mobile members and proportionately to movement of said control means, and movement transmission means interconnecting said first and second mobile members, said assistance means cooperating with said combination of mobile members, being disposed between said first and second mobile members and being operative on said control means according to a predetermined law as a function of the simultaneous but non-identical movements of said first and second mobile members, said control means comprising at least one shaft, a fork fastened to said at least one shaft, a clutch release bearing on which said fork is operative and which is operative on said clutch plates so as to move them apart, a pivot pin for said pedal, a second shaft, and a toothed wheel on said second shaft being fastened to said second mobile member, said first mobile member being fastened to said at least one shaft and meshing with said toothed wheel, said assistance means comprising a spring having respective ends coupled to said first and second mobile members, the arrangement being such that with the clutch engaged said ends of said spring are substantially aligned with said at least one shaft, whereby said spring is charged when the clutch is engaged, a second spring with different characteristics to said first-mentioned spring and acting in opposition thereto, and contributing to aligning said ends of said first-mentioned spring with said at least one shaft when the clutch is engaged, and a toothed idler wheel on said at least one shaft meshing with said second mobile member, and said second spring having its ends respectively coupled to said first mobile member and said toothed idler wheel.

2. Clutch comprising at least one friction disk, clutch plates adapted to clamp said at least one of said clutch plates and adapted to urge said clutch plates together so as to clamp said at least one friction disk and thereby engage the clutch, clutch release control means comprising a pedal and adapted to unclamp said at least one friction disk and thereby release the clutch, assistance means for reinforcing the action of said pedal, a combination comprising at least first and second mobile members each of which is adapted to move along a respective path at the same time as the other of said first and second mobile members and proportionately to movement of said control means, and movement transmission means interconnecting said first and second mobile members, said assistance means cooperatig with said combination of mobile members, being disposed between said first and second mobile members and being operative on said control means according to a predetermined law as a function of the simultaneous but non-identical movements of said first and second mobile members, stop means and a fixed frame, and wherein said first mobile member couples said combination of mobile members to said control means and said second mobile member is in two parts of which a first meshes with said first mobile member and the second is selectively coupled by said stop means to said first part and to said fixed frame and said assistance means being disposed between said first mobile member and second part of said second mobile member.

3. Clutch according to claim 2, further comprising at least one auxiliary spring coupled to said fixed frame and at least one of said mobile members.

4. Clutch according to claim 3, wherein said at least one auxiliary spring is coupled on with clearance.

5. In a clutch comprising at least one friction disk, clutch plates on respective sides of the friction disk, elastic means acting on one of the clutch plates to clamp the friction disk between the plates, clutch release control means comprising a pedal, a first shaft connected to said pedal, and a release fork fastened to said first shaft and cooperable with a clutch release bearing for disengaging the friction disk from between clutch plates, the improvement comprising an assist mechanism for the disengagement of the clutch comprising a first mobile member defined by a large diameter sector gear fixed for rotation with said first shaft, a small diameter pinion meshing with said sector gear, said pinion being fixed for rotation with a second shaft, a second mobile member larger in diameter than said pinion and fixed for rotation with the second shaft, said first and second mobile members being mounted for movement along respective paths at the same time and proportionately with the movement of said clutch release control means, elastic assist means fixed at respective ends to said sector gear and said second mobile member, said elastic assist means applying a preload in the course of clutch disengagement to reduce pedal force, said sector gear and pinion amplifying the relative movement of the ends of said elastic assist means in response to a given rotation of said first shaft.

6. A clutch assist mechanism according to claim 5, wherein said second mobile member comprises a gear wheel.

7. A clutch assist mechanism according to claim 5, wherein said gear wheel meshes with an idler gear mounted on said first shaft.

8. A clutch assist mechanism according to claim 7, wherein an aligning spring opposing the action of said elastic assist means is fixed at one end to said sector gear and at the other end to said idler gear, said aligning spring urging the ends of said elastic assist means into alignment with the axis of said first shaft when the clutch is engaged.

9. A clutch assist mechanism according to claim 5, further comprising means linking said pedal to said shaft disposed on one side of the axis of said clutch, the assist mechanism being disposed on the other side of the axis of said clutch for balancing forces exerted on the fork.

10. A clutch assist mechanism according to claim 5, wherein one end of said elastic assist means is fixed to said sector gear and said sector gear has teeth having a center of curvature, said one end of said elastic assist means is proximate to the center of curvature of the sector gear teeth, said sector gear being fixed to said first shaft at a location being disposed between said sector gear teeth and said one end of said elastic assist means, the other end of said elastic assist means fixed to said second mobile member on the opposite side of said second shaft relative to said sector gear teeth.

11. A clutch assist mechanism according to claim 8, wherein one end of said elastic assist means is fixed to said sector gear and said sector gear has teeth having a center of curvature, said one end of said elastic assist means is proximate to the center of curvature of the sector gear teeth, said sector gear being fixed to said first shaft at a location being disposed between said sector gear teeth and said one end of said elastic assist means, the other end of said elastic assist means fixed to said second mobile member on the opposite side of said second shaft relative to said sector gear teeth.

* * * * *